(12) United States Patent
Yu

(10) Patent No.: US 6,976,736 B2
(45) Date of Patent: Dec. 20, 2005

(54) SHELL FOR BICYCLE SADDLE

(75) Inventor: Tsai-Yun Yu, Taichung Hsien (TW)

(73) Assignee: Selle Tech Industrial Co., Ltd., Taichung Hsien (TW)

(*) Notice: Subject to any disclaimer, the term of this patent is extended or adjusted under 35 U.S.C. 154(b) by 0 days.

(21) Appl. No.: 10/760,343

(22) Filed: Jan. 21, 2004

(65) Prior Publication Data

US 2005/0121951 A1    Jun. 9, 2005

(30) Foreign Application Priority Data

Dec. 5, 2003    (TW) .............................. 92134478 A

(51) Int. Cl.⁷ ............................................. B62J 1/00
(52) U.S. Cl. .......................... 297/215.16; 297/DIG. 2
(58) Field of Search ................. 297/215.16, 195.1, 297/202, 214, DIG. 2, DIG. 1, 452.48, 452.55, 297/452.56, 452.65

(56) References Cited

U.S. PATENT DOCUMENTS

| | | | | |
|---|---|---|---|---|
| 4,345,959 A | * | 8/1982 | Asai et al. ............. | 156/244.11 |
| 5,348,369 A | * | 9/1994 | Yu ............................... | 297/214 |
| 5,397,162 A | * | 3/1995 | Huang ....................... | 297/195.1 |
| 6,030,035 A | * | 2/2000 | Yates ......................... | 297/214 |
| 6,131,994 A | * | 10/2000 | Yates ......................... | 297/214 |
| 6,234,578 B1 | * | 5/2001 | Barton et al. .......... | 297/452.41 |
| 6,670,532 B2 | * | 12/2003 | Maehara ..................... | 84/174 |
| 2003/0164629 A1 | | 9/2003 | Bigolin | |

FOREIGN PATENT DOCUMENTS

| | | | |
|---|---|---|---|
| FR | 002626756 | * | 8/1989 |
| JP | 9-85863 | * | 3/1997 |
| JP | 10-278185 | * | 10/1998 |
| JP | 2003-286627 | * | 10/2003 |

\* cited by examiner

*Primary Examiner*—Milton Nelson, Jr.
(74) *Attorney, Agent, or Firm*—Bacon & Thomas, PLLC

(57) ABSTRACT

A shell for bicycle saddle includes a body and a shock-absorbing member. The body is made of at least one layer of plastic composite materials (PCM) to form the contour of the shell and has at least one opening corresponding to the sitting area of the bicycle saddle. The shock-absorbing member is made of non plastic composite materials having a hardness lower than that of the body. The shock-absorbing member is filled up the at least one opening of the body to form shock-absorbing zones of the bicycle saddle.

8 Claims, 5 Drawing Sheets

SHELL FOR BICYCLE SADDLE

BACKGROUND OF THE INVENTION

1. Field of the Invention

The present invention relates generally to a bicycle saddle, and more particularly to a lightweight shell for bicycle saddle, which provides a satisfactory shock-absorbing function.

2. Description of the Related Art

U.S. Pat. No. 5,348,369 discloses a saddle, which includes a saddle body, a foam, a covering, and two elastic bodies. The saddle body is made of a hard elastic material, having two accommodating holes. The elastic bodies are made of a soft elastic material and are retained within the accommodating holes. This kind of saddle provides a satisfactory shock-absorbing function, however it is too heavy.

US Patent Application Publication No. 2003/0164629A1 discloses an improved structure of bicycle saddle designed to eliminate the aforesaid problem. The shell of this design of bicycle saddle is formed of multiple layers of fiber-reinforced plastic. Further, the body of the shell is made to provide a plurality of holes respectively filled up by a fiber-reinforced plastic with a hardness lower than that of the body, or a fiber-reinforced plastic being the same as that of the body but the number of layers is smaller than that of the body to form elastic zones for absorbing shocks. However, this design of bicycle saddle is still not satisfactory in function. Because fiber-reinforced plastic generally uses a thermosetting resin as the matrix, it is solidified in molding process. When solidified, the elastic property is eliminated, i.e. the fiber-reinforced plastic that fills up the holes of the body of the shell does not provide the expected shock-absorbing function.

SUMMARY OF THE INVENTION

It is therefore the primary objective of the present invention to provide a shell for bicycle saddle, which is durable in use, has a light weight, and provides an elastic shock-absorbing sitting area.

To achieve this and other objects of the present invention, the shell for bicycle saddle comprises a body and a shock-absorbing member. The body is made of at least one layer of plastic composite materials (PCM) to form the contour of the shell. The body has at least one opening corresponding to the sitting area of the bicycle saddle. The shock-absorbing member is made of non plastic composite materials having a hardness lower than that of the body. The shock-absorbing member is filled up the at least one opening of the body to form shock-absorbing zones of the bicycle saddle.

BRIEF DESCRIPTION OF THE DRAWINGS

The advantages and features of the present invention will be better understood by the following description when considered in conjunction with the accompanying drawings, in which.

DETAILED DESCRIPTION OF THE INVENTION

Figure 1:
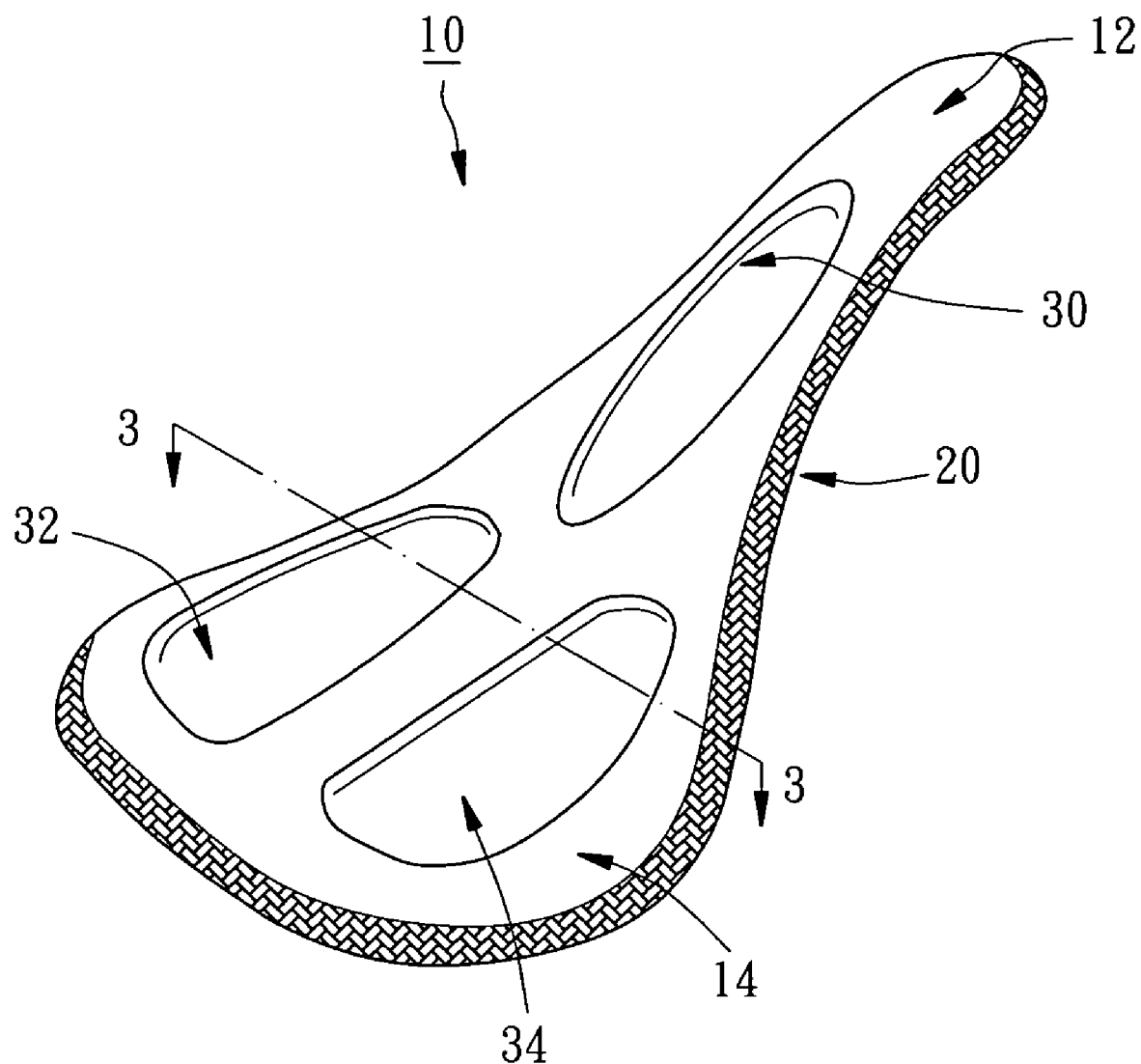
FIG. 1 is a perspective view of a shell for bicycle saddle according to an embodiment of the present invention.
Figure 2:
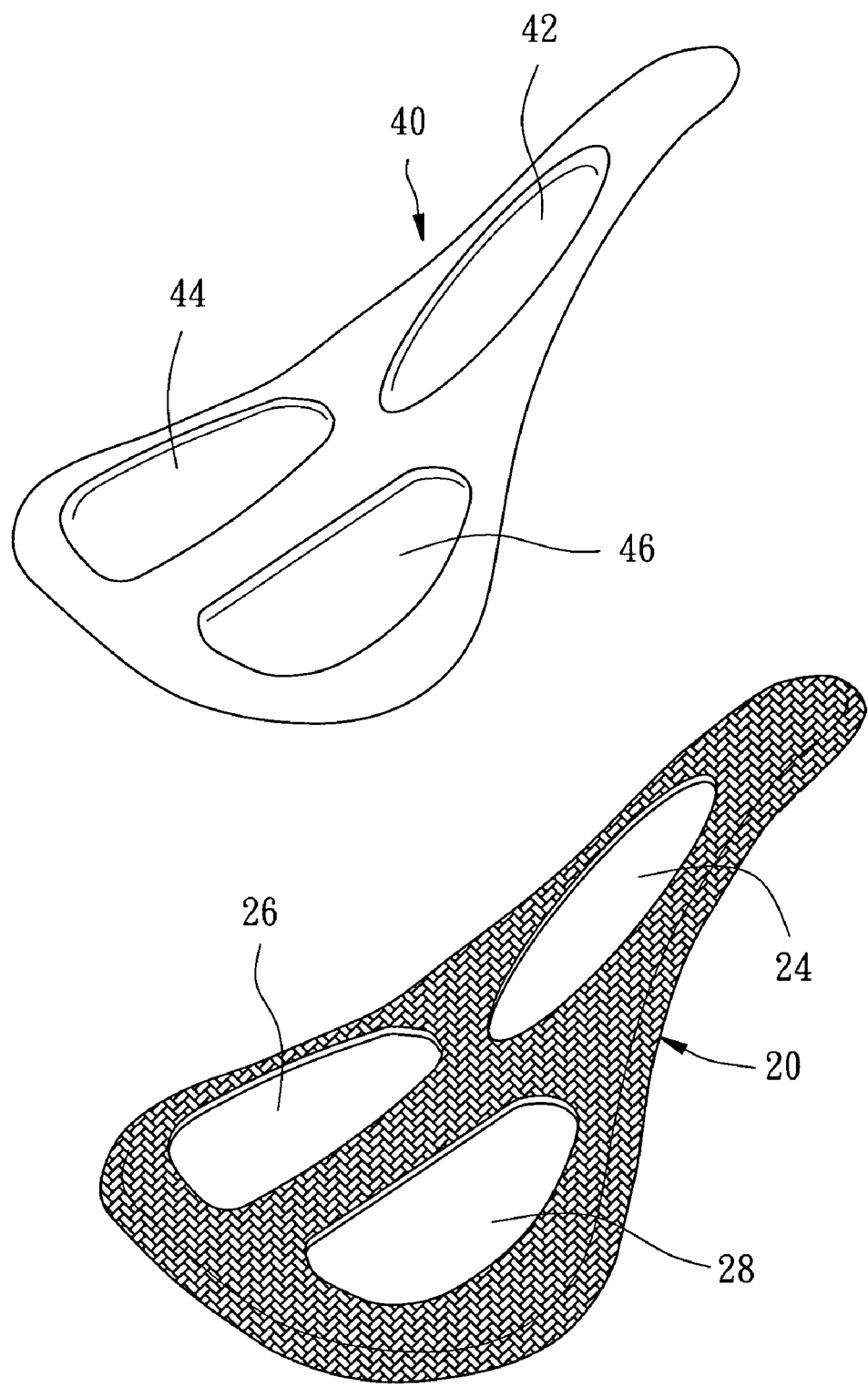
FIG. 2 is an exploded view of the embodiment.
Figure 3:
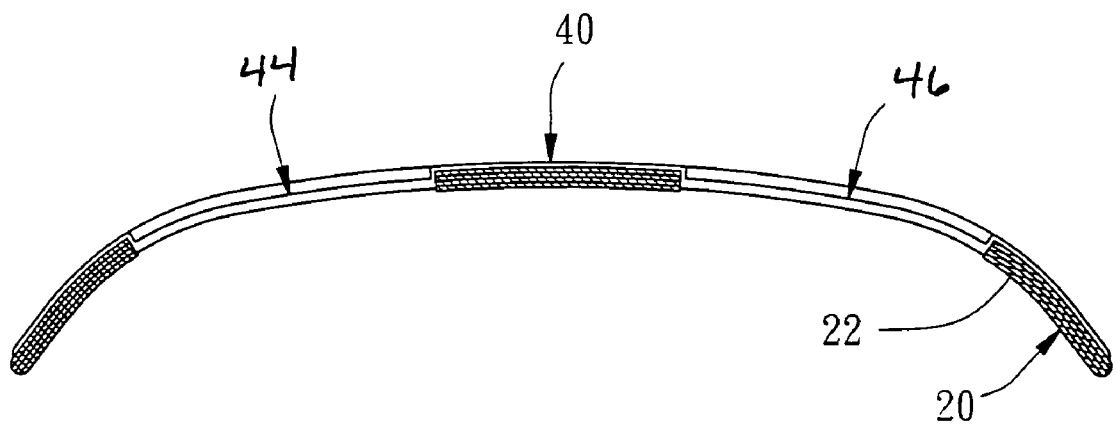
FIG. 3 is a sectional view of the embodiment taken along line 3—3 of FIG. 1.

Referring to FIGS. 1~3, a shell 10 for bicycle saddle in accordance with one embodiment of the present invention is shown. The shell 10 has a narrow front end 12, a relatively wider rear end 14 backwardly extended from the front end 12, and three shock-absorbing zones 30, 32, and 34. The shell 10 comprises a body 20 and a shock-absorbing member 40.

The body 20 is made of one layer or multiple layers of carbon-fiber-reinforced epoxy resin prepreg 22. The extending direction of the fibers of the prepreg 22 is oriented subject to strength requirement, for example, ±45° or 90° relative to the longitudinal axis of the bicycle saddle. The body 20 provides three openings 24, 26, and 28.

The shock-absorbing member 40 is made of a thermoplastic urethane (TPU) film with a hardness lower than that of the body 20, and adhered to the top surface of the body 20. The shock-absorbing member 40 has three retainers 42, 44, 46 fitted to respectively fill up the openings 24, 26, and 28 of the body 20 to form the shock-absorbing zones 30,32 and 34.

Figure 4:
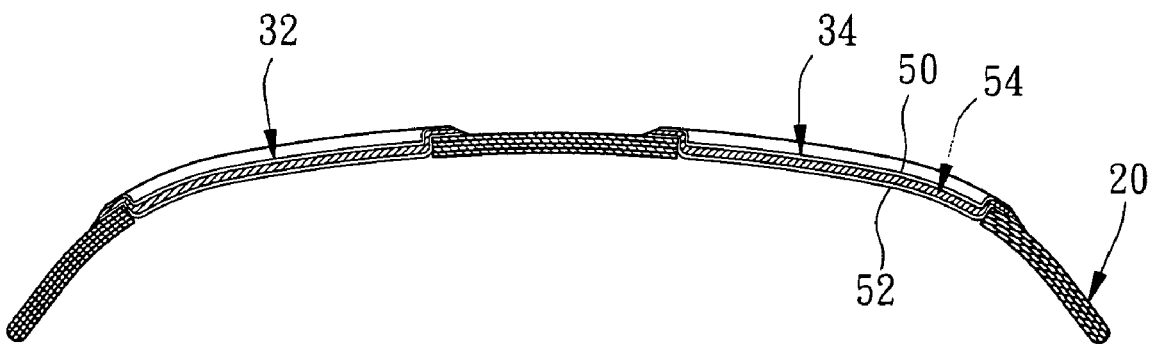
FIG. 4 is a sectional view of a second embodiment according to the present invention.
Figure 5:
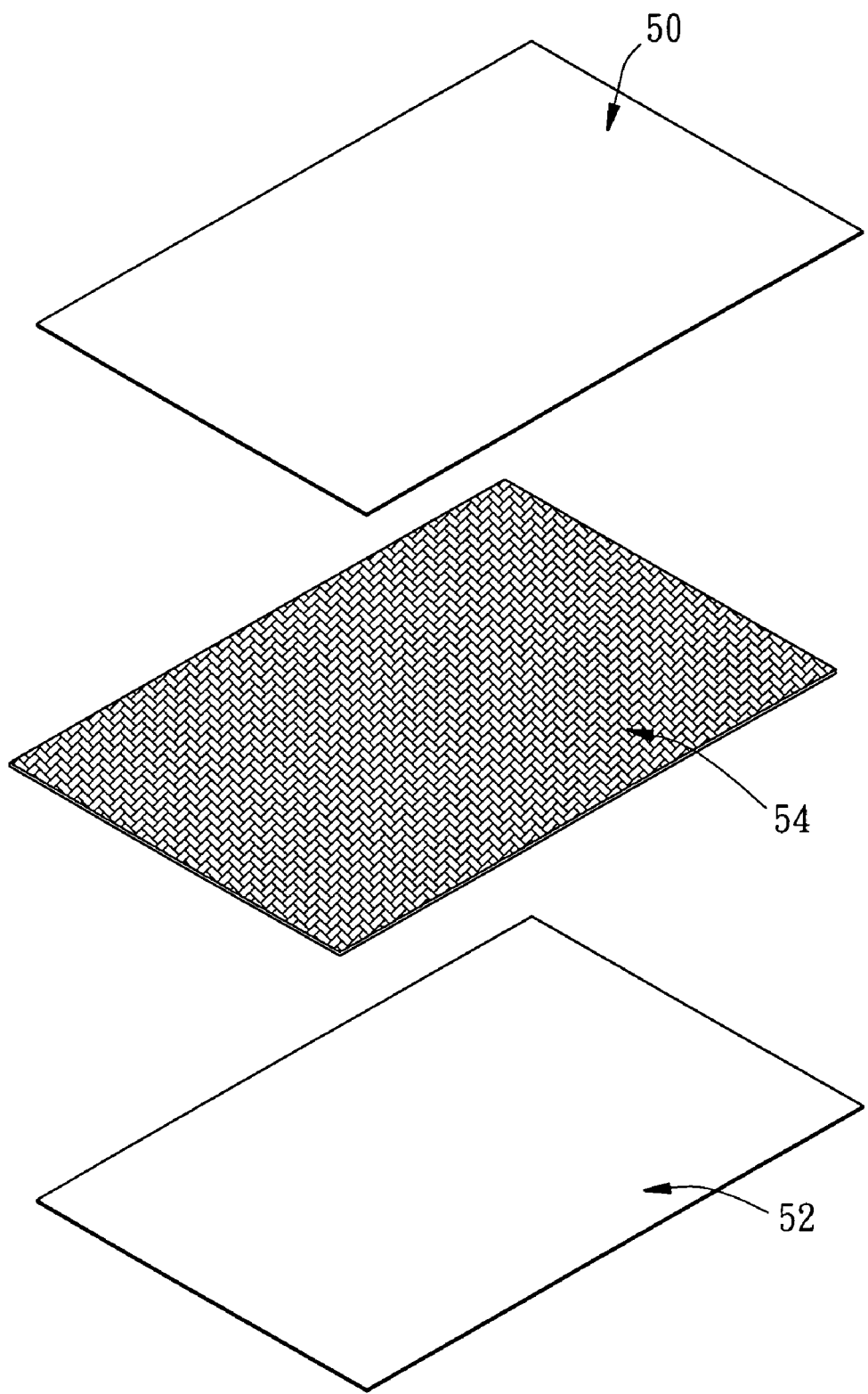
FIG. 5 is an exploded view of the shock-absorbing member of the second embodiment.

FIGS. 4 and 5 show a second embodiment of the present invention. According to this embodiment, the shock-absorbing member 40 is made of two TPU films 50 and 52, and a resin-free carbon-fiber fabric sheet 54 sandwiched in between the TPU films 50 and 52.

Figure 6:
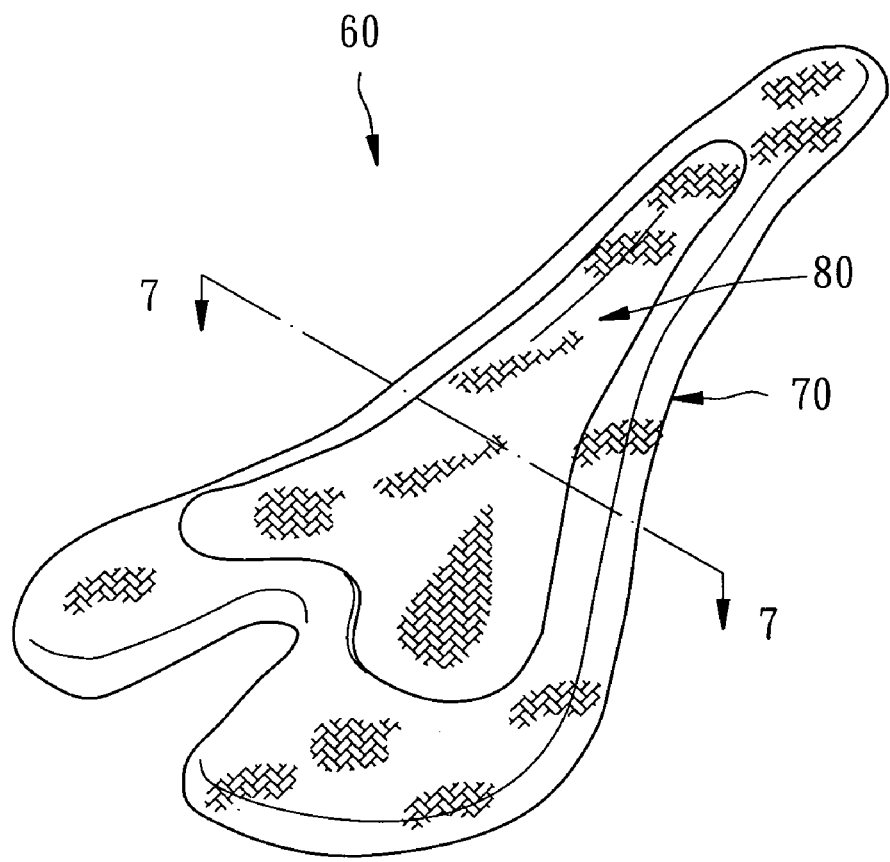
FIG. 6 is a perspective view of a third embodiment according to the present invention.
Figure 7:
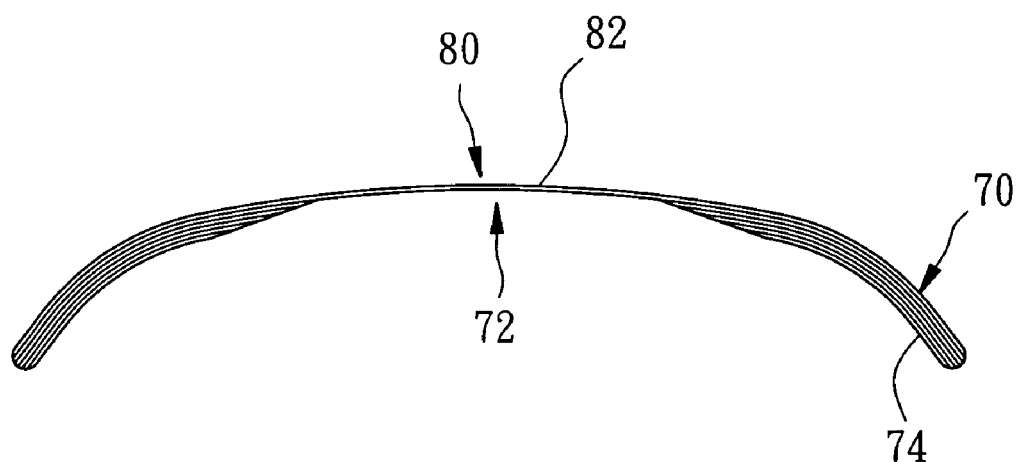
FIG. 7 is a sectional view of the third embodiment taken along line 7—7 of FIG. 6.

FIGS. 6 and 7 show a third embodiment of the present invention. According to this embodiment, the shell, referenced by 60, comprises a body 70 and a shock-absorbing member 82. The shock-absorbing member 82 is made of a resin-free carbon-fiber fabric sheet (other kind of fibers may be used for the sheet). The body 70 is made of at least one layer of carbon fiber-reinforced epoxy resin prepreg 74. During producing, the member 82 is disposed on the top surface of the body 70 along the border of a opening 72 formed on the center area of the body 70, and then put with the body 70 in a molding tool to receive a treatment under an appropriate temperature and pressure so as to form the shell 60. Because the member 82 is resin-free, it is not soldified in molding step. Therefore, the elastic property of the member 82 is preserved to form a shock-absorbing zone 80.

As mentioned, a shell for bicycle saddle constructed according to the present invention has a body made of plastic composite materials and at least one shock-absorbing zone made of non plastic composite materials (PCM), for example, each of said shock-absorbing zones is made from TPU, Fabric sheet, or fabric sheet-reinforced TPU, in the sitting area. Therefore, a lightweight shell for bicycle saddle with a satisfactory shock-absorbing function is provided by the present invention.

What is claimed is:

1. A shell for bicycle saddle comprising:
   a body, made of at least one layer of plastic composite materials, having at least one opening corresponding to a sitting area of the bicycle saddle;
   a shock-absorbing member having a hardness lower than that of said body, filling up said at least one opening; and wherein said shock-absorbing member includes an upper layer of thermoplastic urethane, a bottom layer of thermoplastic urethane, and an intermediate layer of fabric sheet sandwiched in between said upper layer and said bottom layer.

2. The shell for bicycle saddle as claimed in claim 1, wherein said body is made of at least one layer of fiber-reinforced plastic prepreg.

3. The shell for bicycle saddle as claimed in claim 2, wherein a matrix of said fiber-reinforced plastic prepreg is a thermosetting resin.

4. The shell for bicycle saddle as claimed in claim 3, wherein said thermosetting resin is epoxy resin.

5. The shell for bicycle saddle as claimed in claim 2, wherein said fiber-reinforced plastic prepreg of said body is a carbon fiber-reinforced plastic prepreg.

6. A shell for bicycle saddle having a narrow front end and a wide rear end extended from said narrow front end, wherein the shell comprises a body made of at least one layer of plastic composite materials to form the contour of the shell, said body having at least one opening corresponding to a sitting area of the bicycle saddle, and a shock-absorbing member having a hardness lower than that of said body and disposed on a top surface of said body, said shock-absorbing member having at least one retainer filling up said at least one opening of said body;

wherein said body is made of at least one layer of carbon fiber-reinforced epoxy resin prepreg; and wherein said shock-absorbing member is made of a thermoplastic urethane film adhered to a top surface of said body.

7. A shell for bicycle saddle comprising:

a body, made of at least one layer of plastic composite material, having at least one opening corresponding to the sitting area of the bicycle saddle; and a shock absorbing member, made of materials which are not composites of plastics having a hardness lower than that of said body, filling up said at least one opening, and wherein said shock-absorbing member is made of at least one resin-free fabric sheet.

8. The shell for bicycle saddle as claimed in claim 7, wherein said fabric sheet is a carbon-fiber fabric sheet.

* * * * *